US010419268B2

(12) United States Patent
Scarpelli et al.

(10) Patent No.: US 10,419,268 B2
(45) Date of Patent: Sep. 17, 2019

(54) AUTOMATED SCORING OF UNSTRUCTURED EVENTS IN INFORMATION TECHNOLOGY ENVIRONMENTS

(71) Applicant: BMC SOFTWARE, INC., Houston, TX (US)

(72) Inventors: Joseph Scarpelli, Half Moon Bay, CA (US); Ramchandra Phadake, Pune (IN); Mu Xia, Sunnyvale, CA (US); Sameer Pokarna, Pune (IN)

(73) Assignee: BMC Software, Inc., Houston, TX (US)

( * ) Notice: Subject to any disclaimer, the term of this patent is extended or adjusted under 35 U.S.C. 154(b) by 274 days.

(21) Appl. No.: 15/418,060

(22) Filed: Jan. 27, 2017

(65) Prior Publication Data
US 2018/0219723 A1 Aug. 2, 2018

(51) Int. Cl.
G06F 15/173 (2006.01)
H04L 12/24 (2006.01)
H04L 29/06 (2006.01)
G06F 21/55 (2013.01)

(52) U.S. Cl.
CPC ........ H04L 41/0631 (2013.01); G06F 21/552 (2013.01); H04L 41/069 (2013.01); H04L 63/1425 (2013.01)

(58) Field of Classification Search
CPC ............... H04L 63/1425; H04L 63/1408; H04L 67/34
USPC ................................................. 709/223, 224
See application file for complete search history.

(56) References Cited

U.S. PATENT DOCUMENTS 8,332,503 B2 * 12/2012 Takagi .................... H04L 69/40
709/203
2017/0070521 A1 * 3/2017 Bailey ................. H04L 63/1416
2018/0357214 A1 * 12/2018 Ajiro ....................... G06F 11/34

* cited by examiner

Primary Examiner — Wing F Chan
Assistant Examiner — Andrew Woo
(74) Attorney, Agent, or Firm — Brake Hughes Bellermann LLP

(57) ABSTRACT

Detection of anomalous events in the operation of information technology (IT) components includes receiving messages, which describe events in the operation of the IT components in real time, and categorizing and condensing the messages received in a first time interval into message patterns by message pattern type. Based on a distribution of occurrences of the message patterns in the first time interval and in preceding time intervals, anomaly scores are assigned to the message patterns, and one or more of the message patterns are classified as being anomalous message patterns that correspond to potentially anomalous events in the operation of the IT infrastructure installation. A degree of correlation between occurrences of the anomalous message patterns and occurrences of application alarms is determined. Message patterns with high anomaly scores and having a high degree of correlation with application alarms are deemed significant and prioritized for display to users.

24 Claims, 11 Drawing Sheets

| time | tag | message |
|---|---|---|
| 1:00:01 12/1/2015 | app=CRM1 | User jon connected thru gateway g1.border.bmc.com |
| 1:00:01 12/1/2015 | app=CRM2 | User joe connected thru gateway g1.border.bmc.com |
| 1:00:01 12/1/2015 | app=CRM2 | Cross component x-y comm checking heartbeat |
| 1:00:02 12/1/2015 | app=CRM1 | Throttle function invoked from db module |
| 1:00:02 12/1/2015 | app=CRM1 | connectionService heap law – triggering remediation on host sj-lab1.bmc.com |
| 1:00:02 12/1/2015 | app=CRM1 | DB server connection terminated from host sj-lab1.bmc.com |
| 1:00:03 12/1/2015 | app=CRM1 | Cross component comm xyz checking heartbeat |
| 1:00:03 12/1/2015 | app=CRM1 | Cross component y-z checking heartbeat |
| 1:00:04 12/1/2015 | app=CRM2 | User joe connected thru gateway g1.border.bmc.com |
| 1:00:04 12/1/2015 | app=CRM1 | User sue connected thru gateway g3.border.bmc.com |
| 1:00:05 12/1/2015 | app=CRM1 | Cross component a-b checking heartbeat |
| ... | | |
| 1:06:00 12/01/2015 | app=CRM2 | Cross component a-b checking heartbeat |
| 1:06:00 12/01/2015 | app=CRM1 | User Paul connected thru gateway g2.border.bmc.com |
| 1:06:00 12/01/2015 | app=CRM2 | Throttle function invoked from db module |
| 1:06:00 12/01/2015 | app=CRM1 | Cross component x-y checking heartbeat |
| 1:06:02 12/01/2015 | app=CRM2 | DB Server connection terminated from host sj-lab1.bmc.com |
| ... | | |
| etc. | Millions of various messages per hour/day | |

FIG. 2

| tag | message pattern |
|---|---|
| 1:00:00-1:05:00 | |
| app=CRM1 | ConnectionService heap low -- triggering remediation on host sj-lab1.bmc.com |
| app=CRM1 | DB Server connection terminated from host... |
| app=CRM1 | Throttle function invoked from db module |
| app=CRM1 | User *** connected thru gateway *** |
| app=CRM1 | Cross component *** comm checking heartbeat |
| ... | |
| app=CRM2 | Throttle function invoked from db module |
| app=CRM2 | User *** connected thru gateway *** |
| app=CRM2 | Cross component *** comm checking heartbeat |
| ... | |
| 1:05:00-1:10:00 | |
| app=CRM1 | Throttle function invoked from db module |
| app=CRM1 | User *** connected thru gateway *** |
| app=CRM1 | Cross component *** comm checking heartbeat |
| app=CRM2 | DB Server connection terminated from host... |
| ... | |
| 1:10:00-1:15:00 | |
| ... | |
| etc. | |

FIG. 4

| tag | Message pattern | Significant Pattern |
|---|---|---|
| app=CRM1 | ConnectionService heap low – triggering remediation on host sj-lab1.bmc.com | Yes |
| app=CRM1 | DB Server connection terminated from host. | No |
| app=CRM1 | Throttle function invoked from db module | No |
| app=CRM1 | User *** connected thru gateway *** | No |
| app=CRM1 | Cross component *** comm checking heartbeat | No |
| app=CRM2 | Throttle function invoked from db module | No |
| app=CRM2 | User *** connected thru gateway *** | No |
| app=CRM2 | Cross component *** comm checking heartbeat | No |

AUTOMATED SCORING OF UNSTRUCTURED EVENTS IN INFORMATION TECHNOLOGY ENVIRONMENTS

TECHNICAL FIELD

This description relates to the operation and maintenance of information technology infrastructure.

BACKGROUND

Information technology (IT) infrastructure refers to the set of hardware, software, network resources and services required for the existence, operation and management of an organization's IT environment. The IT infrastructure allows the organization to deliver IT solutions and services (e.g., applications) to its employees, partners and/or customers and is usually internal to an organization and deployed within owned facilities.

The IT infrastructure may be maintained, for example, by administrators, so that the IT solutions and services are properly delivered to users without interruptions or down time. An aspect of this maintenance requires that operations of diverse components of the IT infrastructure are continuously monitored so that problems can be addressed in good time. In example implementations, the diverse components of the IT infrastructure (including applications running on the IT infrastructure) may report machine-generated messages (e.g., performance data, event data, log or message data, error data, etc.) in real time or near real time. In principle, the IT administrators may use the machine-generated messages to assess the health of the IT infrastructure to identify specific problems with the components of the IT infrastructure that need to be addressed. In practice, with typical size IT infrastructure, the volume of machine-generated messages (most of which can be routine or non-problematic log and event reporting data) can be massive. Administrators are likely to be overwhelmed by the massive amount of machine-generated messages and unable to peruse the messages meaningfully to quickly identify any IT infrastructure anomalies or problems that should be addressed. Going through the large volume of messages, and making decisions, or taking actions to address anomalies or problems based on the messages, can be very difficult if not an impossible task for the administrators of the IT infrastructure.

Consideration is now being given to systems and methods for utilizing the machine-generated messages generated by an IT infrastructure to quickly identify or recognize specific potential problems with the IT infrastructure.

SUMMARY

A computer system for detecting anomalous events in the operation of information technology (IT) components. The computer system includes a database, which receives messages that describe events in the operation of the IT components in real time and stores the received messages as raw messages. The raw messages include raw messages that have varying content. The computer system includes a signature generator, which categorizes the raw messages received in a first time interval by message pattern type and condenses the raw messages into message patterns by message pattern type.

In an aspect, the computer system further includes an anomaly scorer that, based on a distribution of occurrences of the message patterns in the first time interval in an anomaly scoring time period and in one or more preceding time intervals in the anomaly scoring time period, classifies one or more of the message patterns in the first time interval as being anomalous message patterns that correspond to potentially anomalous events in the operation of the IT components. A relative anomaly score is computed for each of the message patterns.

In a further aspect, the computer system includes an application mapper, which correlates occurrences of anomalous message patterns with occurrences of application alarms. Anomalous message patterns with high anomaly scores (or high anomaly scores boosted by application-correlation significance factors) are deemed significant and prioritized for display to a user.

The details of one or more implementations are set forth in the accompanying drawings and the description below. Other features will be apparent from the description and drawings, and from the claims.

BRIEF DESCRIPTION OF THE DRAWINGS

FIG. 2 is a screen shot illustration of an example portion of raw machine-generated messages that may be generated by monitoring tools of an IT infrastructure, in accordance with the principles of the present disclosure.

FIG. 4 is a screen shot illustration of an example of raw machine-generated messages (e.g., the raw messages of FIG. 2) being condensed or aggregated into message patterns of different pattern categories or types, in accordance with the principles of the present disclosure.

FIG. 6 is a screenshot illustration of an example of message patterns (e.g., the message patterns of FIG. 5) that have been assigned a significance status (i.e., significant or not significant), in accordance with the principles of the present disclosure.

DETAILED DESCRIPTION

Figure 1:
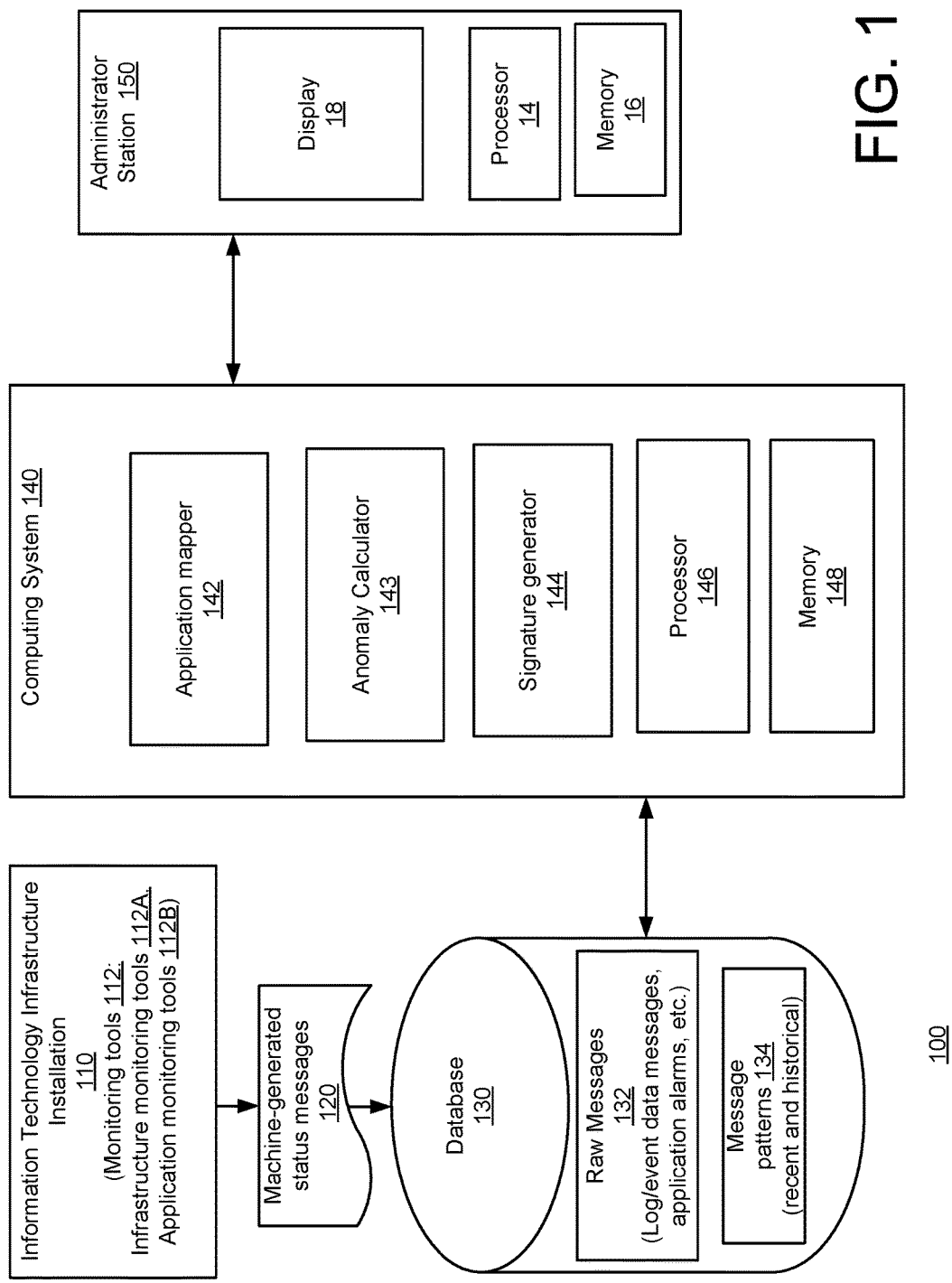
FIG. 1 is a block diagram illustration of an example system for identifying messages in the machine-generated message data of an IT infrastructure installation that may potentially correspond to non-routine, abnormal, or anomalous incidents in the state, activities and performance of an IT infrastructure, in accordance with the principles of the present disclosure.

Information technology (IT) infrastructure refers to the set of hardware, software, network resources and services required for the existence, operation and management of an organization's IT environment (hereinafter "IT infrastructure installation"). The IT infrastructure installation may include physical, virtual, and cloud systems. The IT infrastructure installation may allow the organization to deliver IT solutions and services (e.g., applications) to users. The IT infrastructure installation may include or be coupled to IT infrastructure monitoring agents or tools (e.g., server monitoring tools, application monitoring tools, network monitoring tools, storage monitoring tools, etc.) that monitor the state, activities, and performance of components (e.g., servers, applications, networks, etc.) of the IT infrastructure installation in operation. The IT infrastructure monitoring tools may automatically collect or log data on the state, activities and performance of the components of the IT infrastructure installation, and report the data in a real-time or near real-time stream of messages (hereinafter "message stream"). The messages may, for example, include alphanumeric text content describing events or incidents in the operation of the IT infrastructure installation.

An administrator may study the message stream, for example, to try to identify messages that may correspond to non-routine, abnormal, or anomalous events or incidents in the state, activities, or performance of the components of the IT infrastructure installation. The administrator may decide to take remedial actions to maintain or improve IT infrastructure performance based on, for example, the identified messages.

For convenience in description herein, any of these non-routine, abnormal, or anomalous events or incidents may be referred to hereinafter as an "anomalous event." Further, a message corresponding to such an anomalous event may be referred to hereinafter as an "anomalous message." Furthermore, the message stream (which includes data automatically collected and reported by the IT infrastructure monitoring tools) may be referred to hereinafter as the "machine-generated messages."

An IT infrastructure installation may generate massive or voluminous amounts of the machine-generated messages (which may include routine log data). For example, log data can reach hundreds of gigabytes of data per day for a typical IT infrastructure installation of a large organization. Simply collecting, centralizing, and storing data at this volume can be challenging. Furthermore, an administrator may find it difficult, if not impossible, to parse through the large volumes of the machine-generated messages to identify a few messages that may correspond to anomalous events in operation of the IT infrastructure installation.

Systems and methods described herein provide computer tools for identifying the few messages (anomalous messages) in the voluminous machine-generated messages of an IT infrastructure installation that may potentially correspond to anomalous events in the operation of the IT infrastructure installation.

FIG. 1 is a block diagram that illustrates an example system 100 for identifying anomalous messages in the machine-generated messages of an IT infrastructure installation that may potentially correspond to anomalous events in the operation of the IT infrastructure installation, in accordance with the principles of the present disclosure.

Example system 100 may be coupled to an IT infrastructure installation 110, which may include hardware, software (e.g., applications), network resources, services, and other components required for delivering IT solutions and services to users. System 100 may include a computing system 140 that is configured to identify, at least approximately, the anomalous messages that are present in the machine-generated messages (e.g., machine-generated messages 120) of IT infrastructure installation 110. System 100 may further include one or more databases (e.g., database 130).

IT infrastructure installation 110 may include, or be coupled to, monitoring tools 112. Monitoring tools 112 may include any number of monitoring tools (e.g., application server monitoring tools, database monitoring tools, server monitoring tools, ERP monitoring tools, end-user monitoring tools, middleware and portal monitoring tools, virtualization monitoring tools, etc.) that are configured to collect or log data on the state, activities and performance of components of the IT infrastructure, and to report the data as machine-generated messages 120. In the example shown in FIG. 1, monitoring tools 112 may, for example, include infrastructure monitoring tools 112A, and application monitoring tools 112B, etc.

Machine-generated messages 120 that are received from monitoring tools 112 may be stored as raw data (e.g., raw messages 132) in database 130. System 100 may also include a store of message patterns (e.g., message patterns 134) in database 130 or in another database.

System 100, which may be hosted on one or more physical or virtual machines, may be accessible to, or connected to, a client computer (e.g., administrator station 150). Administrator station 150, which may be connected to computing system 140, may include a processor 14, a memory 16, and a display 18. An administrator may view a list of the anomalous messages that are determined by computing system 140 to be present in machine-generated messages 120, for example, on display 18 of administrator station 150. Furthermore, the administrator may use administrator station 150 in conjunction with computing system 140 to search machine-generated messages 120, for example, to find and see anomalous messages in machine-generated messages 120.

Computing system 140, in addition to a processor 146 and a memory 148, may include one or more modules (e.g., application mapper 142, anomaly calculator 143, and signature generator 144, etc.) that include processes for finding and classifying anomalous messages in machine-generated messages 120.

In example implementations, machine-generated messages 120 may be log or event data (messages) of IT infrastructure installation 110. The log or event data (messages) may not conform to a specific structure and may be generated at high rates. A majority of the log or event data (messages) may not be data that is indicative of an actual problem in IT infrastructure installation 110, but may be noise (i.e., routine or non-problematic log data) that can mask a data item (i.e., message) that is indicative of an actual problem in IT infrastructure installation 110. In a large IT infrastructure installation, the number of machine-generated messages may easily be in the millions per hour. An administrator would not be able to timely view, browse, or peruse this number of events or messages to try to identify or locate anomalous messages in machine-generated messages 120 without the aid of computer system 140.

FIG. 2 shows a portion 200 of machine-generated messages 120 that may be generated by monitoring tools 112 of IT infrastructure installation 110 and collected in raw messages 132. Portion 200 shows, for example, sample messages (i.e., messages 201-211) that may be generated in a sample five second time interval (i.e., 1:00:01 to 1:00:05 hrs.) and sample messages (i.e., messages 212-216) generated in a sample two second time interval (i.e. 1:06:00 to 1:06:02 hrs.). The messages shown in portion 200 may, for example, be log or event data (messages) generated by infrastructure monitoring tools 112A (e.g., IT Data Analytics (IDTA), TrueSight Infrastructure Management (TSIM), etc.). Each message may include a time stamp, an application tag, and alphanumeric message content describing or logging, for example, an event. It will be understood that the number of sample messages shown in FIG. 2 for purposes of illustration is a very small fraction of the millions of various messages that may be generated per hour by monitoring tools 112 in IT infrastructure installation 110.

In an example implementation, the processes of computing system 140 (e.g., application mapper 142, anomaly calculator 143, and signature generator 144, etc.) for finding and classifying anomalous messages in machine-generated messages 120 may locate the anomalous messages and aggregate the anomalous messages in small size collections for display. The small size collections may be sufficiently small (e.g., ~1000 messages or ~100 messages) so as to be reasonably viewed, browsed, or perused, for example, on administrator station 150 by the administrator, to visually identify the anomalous messages in good time.

In the example implementation, the processes of computing system 140 (e.g., in application mapper 142, anomaly calculator 143, and signature generator 144, etc.) may involve identifying "significant" events or anomalous behaviors based on how these events or anomalous behaviors impact availability or performance of applications on IT infrastructure installation 110.

Figure 3:
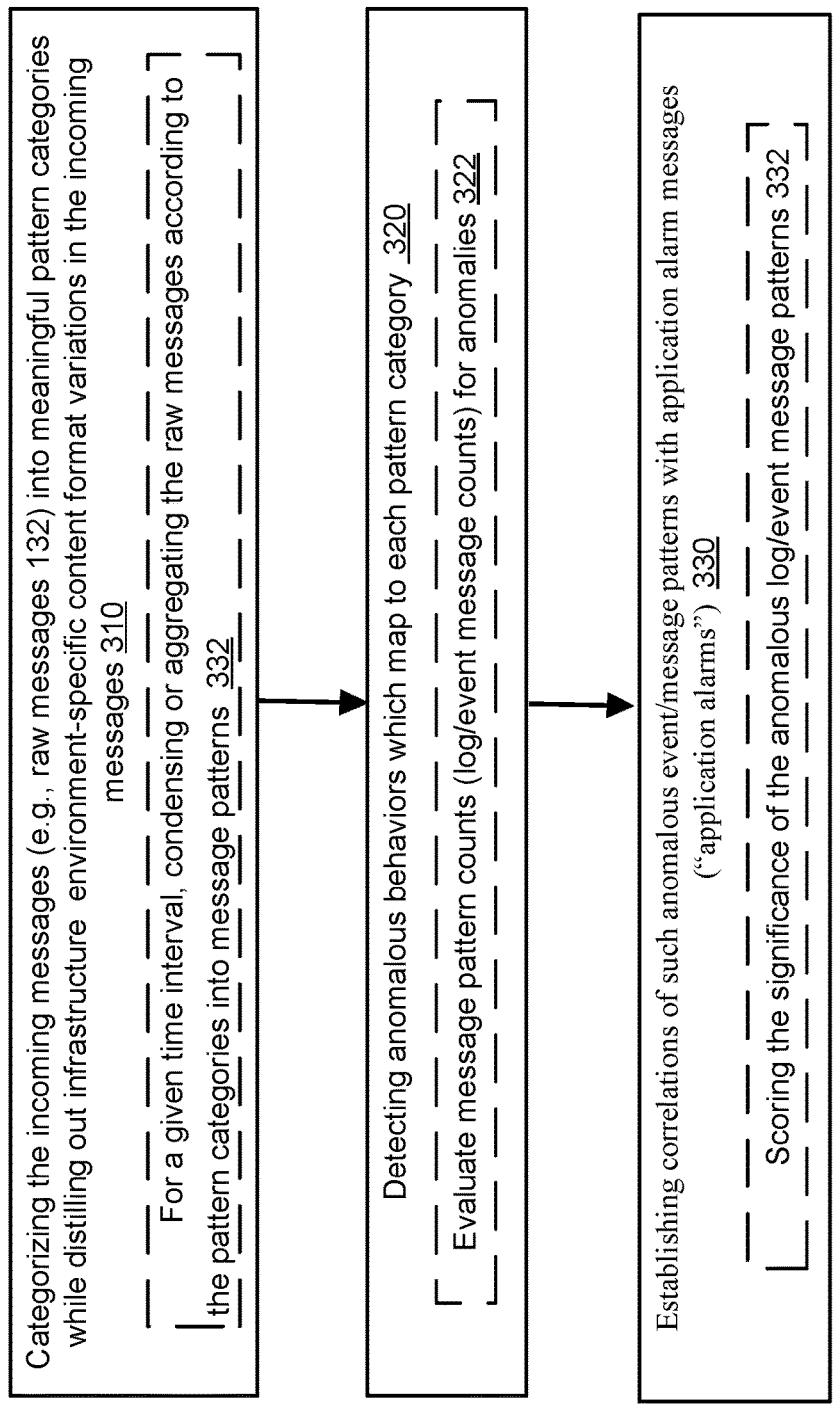
FIG. 3 is a flowchart illustrating an example method, which may be implemented by a computing system, to locate anomalous messages to within small-size sub portions of machine-generated messages by correlating the machine-generated messages with anomalous behaviors or significant events in the IT infrastructure, in accordance with the principles of the present disclosure.

FIG. 3 shows an example method 300 that may be implemented by computing system 140 to locate the anomalous messages in machine-generated messages 120 by comparing messages in machine-generated messages 120 (or raw messages 132) with the significant events and or anomalous behaviors, in accordance with the principles of the present disclosure.

Integrated monitoring systems (e.g., monitoring tools 112 that include both infrastructure monitoring tool 112A and application monitoring tools 112B), which are able to collect log and event data (hereinafter "log data" or "log messages") along with application availability and or performance data (hereinafter "application performance" data) may be able to learn which log message patterns are significant by establishing correlations between the log data and application performance data over time. However, establishing such correlations can be difficult due to variability in the content format of the log data (messages) in machine-generated messages 120. Implementation of method 300 by computing system 140 provides a practical way for identifying to an administrator the log messages patterns in machine-generated messages 120 that are significant.

Method 300 may include categorizing the incoming machine-generated messages 120 (which are stored as raw messages 132) into pattern categories (or pattern types) while distilling out infrastructure environment-specific content format variations in the incoming messages (310). This may allow computing system 140 to track the incoming messages in a meaningful way by pattern categories over time and over the entire infrastructure environment (i.e., across variations in hosts, users, instance names, etc.). For example, with reference to FIG. 2, all user login messages (e.g., message 201: "User jon connected thru gateway g1 .border.bmc.com", message 202: "User joe connected thru gateway g1 .border.bmc.com, etc.) may be placed in a "user login" message pattern category or type characterized as having a message pattern: "user * connected thru gateway *").

Categorizing the incoming messages 310 (e.g., raw messages 132) may further include, for a given time interval, condensing or aggregating the large number of raw messages according to the pattern categories or types into a limited number of message patterns (332). The message patterns may be stored for example, in message patterns 134 in database 130.

FIG. 4 shows an example 400 of condensing or aggregating the raw messages (e.g., the raw messages of FIG. 2, messages 201-211 in time interval 1:00:01-1:00:05 hrs, messages 212-216 in time interval 1:06:00-1:06:02 hrs., etc.) according to the pattern categories or types into message patterns for various time intervals, in accordance with the principles of the present disclosure. In particular, for the time interval 1:00:00-1:05:00 hrs., FIG. 4 shows the raw messages of FIG. 2 being condensed or aggregated into message patterns 401, 402, 403, 404, 405, 403, 404 and 405. For the time interval 1:05:00-1:10:00 hrs., FIG. 4 shows the raw messages of FIG. 2 being condensed into message patterns 403, 404, 405 and 402.

After this level of condensing or aggregation, the total number of messages (message patterns) that the administrator has to view, browse or peruse may be dramatically reduced from the millions of messages to the thousands or hundreds of messages patterns.

Method 300 further includes detecting anomalous behaviors that map to each pattern category or type (320). This may involve evaluating message pattern counts (of the log messages) for anomalies (322). Unusual counts of a message pattern in a time interval may indicate anomalous behavior and lead to designating the message pattern as an "anomalous" message pattern.

Method 300 also includes establishing correlation factors of the anomalous message patterns with application alarm messages ("application alarms") (330). The application alarms may be generated, for example, by application monitoring tool 112B (e.g., App Visibility). The correlation factors may enable scoring of a significance of such anomalous message patterns (of the log messages) relative to application availability or performance, and allow computing system 140 to determine what message patterns are likely to indicate problems with the IT infrastructure and prioritize display of such message patterns as being "significant" message patterns to the administrator (332).

Figure 5:
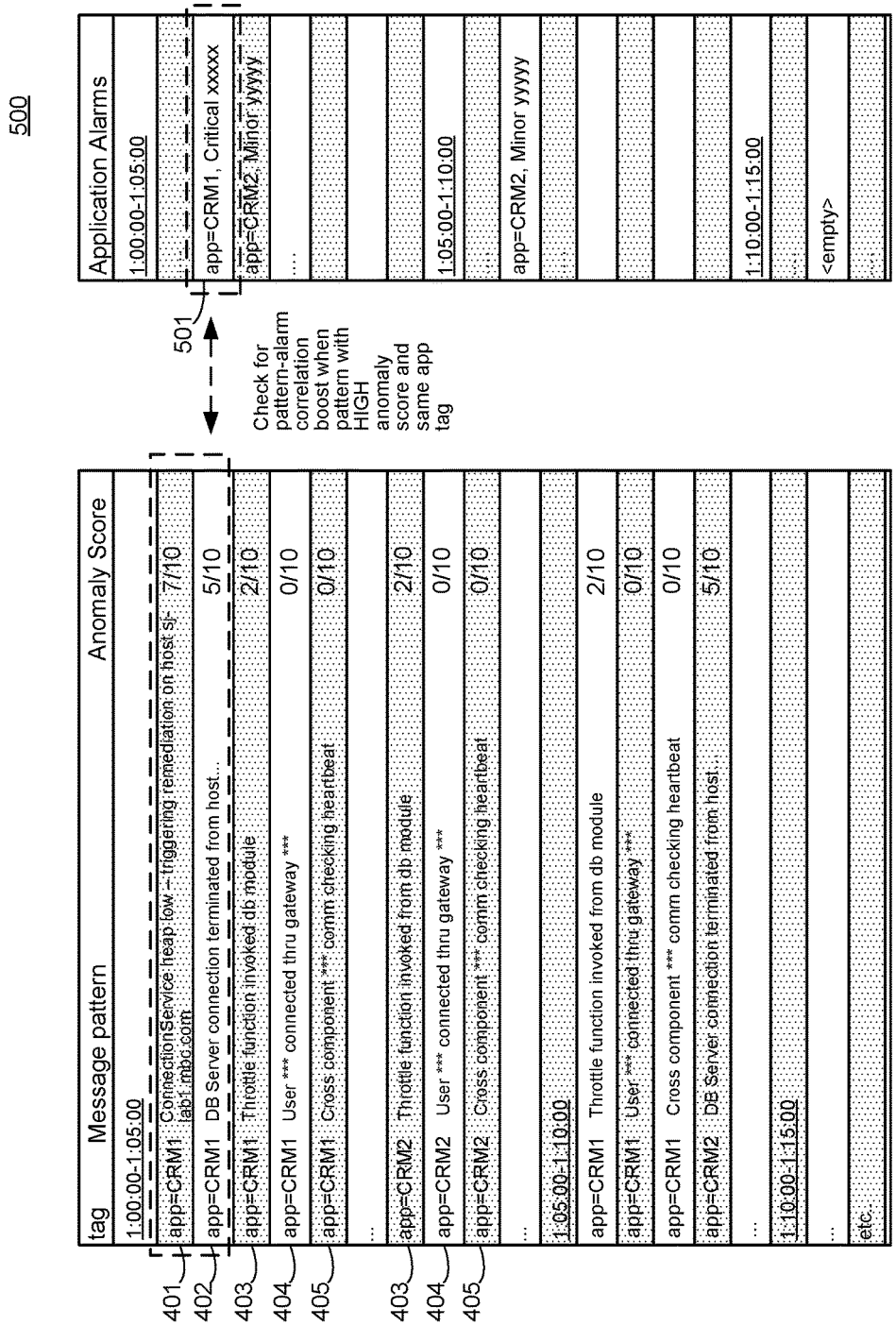
FIG. 5 is a screen shot illustration of example condensed or aggregated message patterns (e.g., the condensed or aggregated message patterns of FIG. 4) that have been assigned message pattern counts and anomaly scores, in accordance with the principles of the present disclosure.

FIG. 5 shows an example 500 of condensed or aggregated message patterns (e.g., the condensed or aggregated message patterns of FIG. 4), which have been assigned anomaly scores by computer system 140 based on message pattern counts (log message counts), in accordance with the principles of the present disclosure.

In particular, for the time interval 1:00:00-1:05:00 hrs (FIG. 4), FIG. 5 shows message patterns 401, 402, 403, 404, 405, 403, 404 and 405 as being assigned anomaly scores of 7/10, 5/10, 2/10, 0/10, 0/10, 2/10, 0/10, and 0/10, respectively, by computer system 140. FIG. 5 further shows that the message patterns 401 and 402 (with relatively high anomaly scores of 7/10 and 5/10, respectively) are correlated by computer system 140 with an application alarm (e.g., application alarm 501: "app=CRM1, Critical xxxxx"). Application alarm 501 may have been generated, for example, by application monitoring tool 112B. Computer system 140 may try to establish the foregoing message pattern-application alarm correlation for instances where the message pattern has a high anomaly score, and where the message pattern and application alarm both have the same tag (e.g., "app=CRM1"). In an example implementation, a message pattern may be scored or designated as being a "significant" pattern or a "not significant" pattern based on the strength of its correlation with an application alarm.

FIG. 6 shows an example 600 of message patterns of FIG. 5 that have been assigned a significant pattern status or a not significant pattern status, in accordance with the principles of the present disclosure. In particular, FIG. 6 shows, for example, message pattern 401 (of FIG. 5) being designated as a "significant" pattern by a "Yes" designator under the column heading "Significant Pattern," and the remainder message patterns (e.g., message patterns 402-405) as being designated "not significant" patterns by a "No" designator under the column heading "Significant Pattern."

Message patterns that are scored or designated as being significant may be displayed to the administrator (e.g., on display 18 of administrator station 150). The total number of messages (significant message patterns) that the administrator has to view, browse, or peruse may be dramatically reduced from the thousands or hundreds of anomalous message patterns (FIG. 4) to tens of "significant" anomalous message patterns (FIG. 6).

Figure 7:
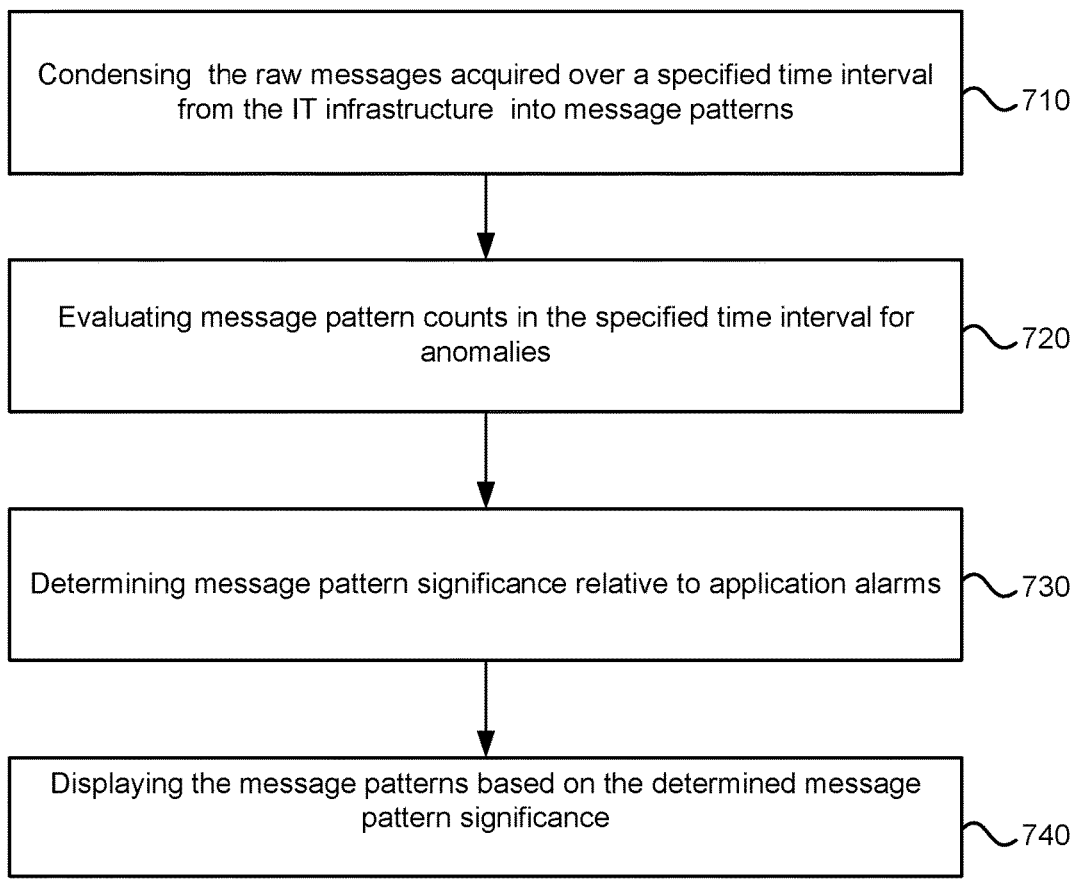
FIG. 7 is a flowchart illustrating an example method for locating anomalous messages in machine-generated messages, and determining significance of the anomalous messages, in accordance with the principles of the present disclosure.

FIG. 7 shows an example method 700, which may be implemented (e.g., by computing system 140) to identify the anomalous messages in machine-generated messages 120 generated by monitoring tools of an IT infrastructure installation, in accordance with the principles of the present disclosure.

The machine-generated messages 120 may, for example, include log or event data messages ("log messages") and also include application performance data messages generated by the monitoring tools in the IT infrastructure installation. The log messages may include messages that are at least partially unstructured (i.e., have free form content). The application performance data messages may include application alarm messages.

Method 700 may be performed in several stages: condensing the raw messages (e.g., log messages), which may be acquired over a specified time interval from the IT infrastructure, into message patterns (710); evaluating message pattern counts in the specified time interval for anomalies (720); determining message pattern significance relative to application alarms (730); and displaying the message patterns based on the determined message pattern significance (e.g., on display 18 of administrator station 150) (740).

The several stages 710-730 of method 700 (leading up to stage 740: "displaying the message patterns based on the determined message pattern significance") are described in further detail below.

Condensing the Raw Messages into Message Patterns 710

Computing system 140 may handle and process large volumes of "unstructured" message data (e.g., log messages or other generic events that are not well described or structured in message data) for display by auto-categorization and representation of the log messages into message types that can be counted and tracked. Events (messages) that are internally generated (e.g., based on monitoring and trigger thresholds) by the IT infrastructure installation can have associated metadata that describes the events formally. Such metadata may be used to categorize the events (messages). However, other messages (e.g., log messages) usually do not include metadata that describes what the event represents (i.e., the log messages are unstructured or semi-structured).

Condensing the raw messages into patterns 710 involves automatically aggregating the raw messages (e.g. unstructured log messages) into distinct message patterns, which firstly can be tracked, and which secondly can be easily read and understood by humans (e.g., administrators). In an example implementation, the distinct message patterns may be iteratively determined by using a string distance algorithm to determine if two messages are similar (i.e., if the alphanumeric string contents of the two messages are similar) and aggregating similar messages into a same base pattern. This manner of aggregation of the raw messages into base patterns allows computing system 140 to track messages over time by message patterns category or type. The "base" message strings used in the base pattern may be created and refined over time so that the variable textual information or aspects (e.g., parameter information such as host name, user name, Internet protocol (IP) address, etc.) in the raw messages can be distilled out of the base patterns. This feature of distilling out the variable textual information may be particularly useful when processing messages in environments (e.g., Software as a Service (SaaS) environments monitored by monitoring tool 112A such as TrueSight Intelligence) that require the handling of messages from diverse customers who may include correspondingly diverse variable textual information (e.g., parameter information such as host name, user name, Internet protocol (IP) address, etc.) in the messages. The alphanumeric message string of a base pattern may be referred to herein as the "signature" of the base pattern.

Figure 8:
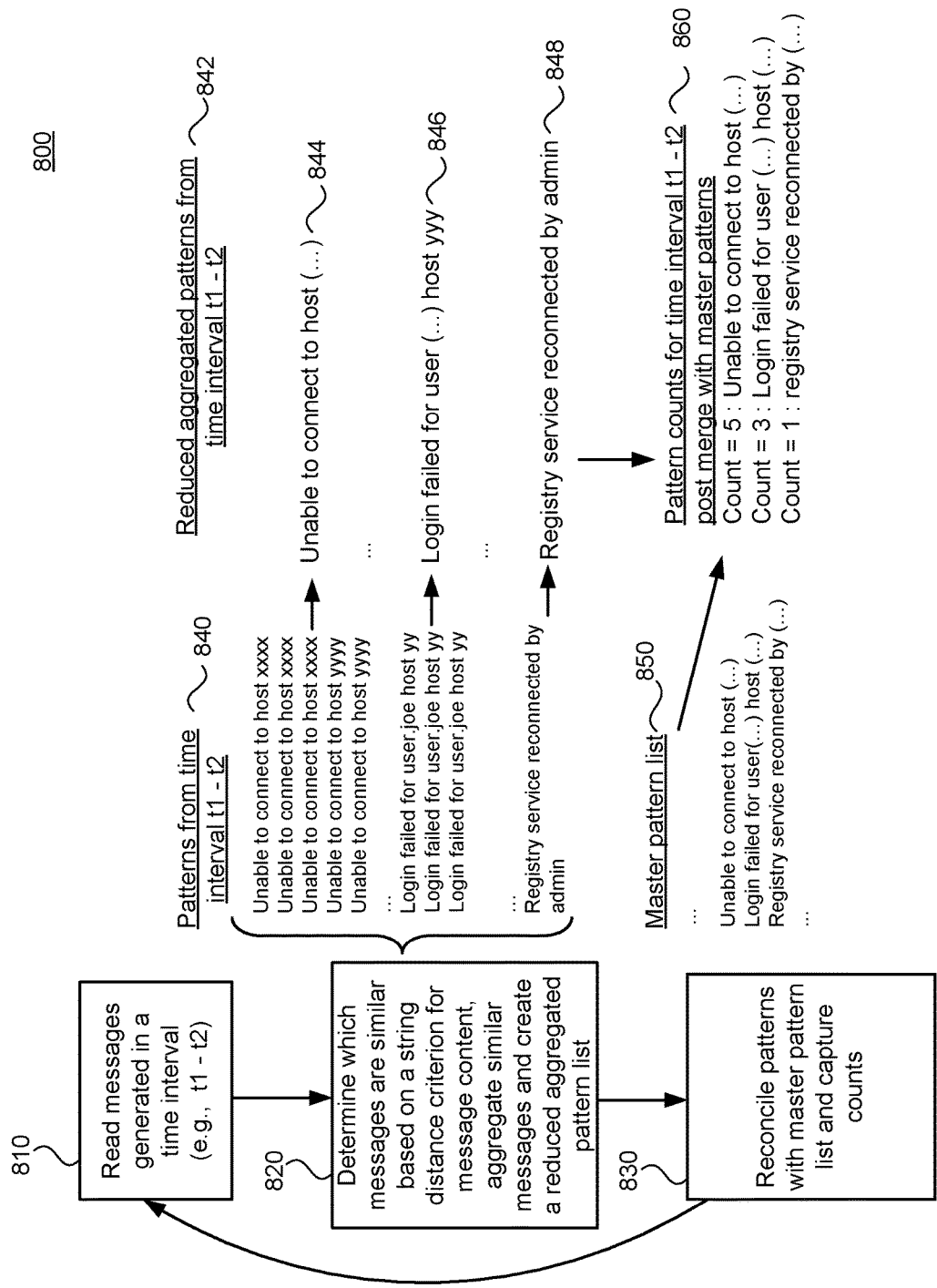
FIG. 8 is a flowchart illustrating an example method for iteratively determining distinct message patterns that can be used to condense or aggregate raw messages received in a given time interval, in accordance with the principles of the present disclosure.

FIG. 8 shows an example method 800 for iteratively determining distinct base message patterns that can be used to condense or aggregate raw messages received over a time interval from the IT infrastructure installation, in accordance with the principles of the present disclosure. Method 800 may, be implemented, for example, by processes and algorithms in signature generator 144 of computing system 140.

Method 800 may include reading raw log messages generated in a time interval (e.g., time interval t1-t2) (810). In FIG. 8, a batch of example raw log messages (generated in a time interval t1-t2) is shown under the heading "patterns from time interval t1-t2" 840. The batch may possibly include thousands or millions of raw log messages.

Method 800 may further include determining which messages are similar based on a string distance criterion for message content (i.e., the alphanumeric string content of the message), aggregating similar messages and creating a reduced aggregated pattern list (e.g., reduced aggregated patterns from time interval t1-t2, 840) (820). Determining which messages are similar may involve using a string distance algorithm (e.g., Levenshtein algorithm) to determine a distance between two (message) strings. All (message) strings may be checked for relative closeness in distance relative to a threshold distance value. Two similar looking (message) strings that have a string distance closer than the threshold distance value may be placed in a same log message group. All strings (messages) with a lower string distance than the threshold may be compared with each other and placed in the same log message group. This process may be repeated until all strings (messages) generated in the time interval (e.g., t1-t2) are grouped or aggregated in respective log message groups. From the possibly millions of raw log messages, only a few log message groups may be formed. FIG. 8 shows, for example, (under the heading "reduced aggregated patterns from time interval t1-t2" 842), three log message groups (i.e., "unable to connect to host ( . . . )" 844, "login failed for user ( . . . ) host yyy" 846, and "registry service reconnected by admin" 848). The possibly thousands or millions of log messages generated in the time interval t1-t2 may be aggregated to one of these three log message groups (i.e., groups 844, 846 and 848). Each group may contain a number of related and similar log messages and their associated counts. A message count may denote how many times the exact message has repeated within the batch of messages in a given time interval (e.g., t1-t2). An example of message pattern counts is shown in FIG. 8 (under the heading "Pattern counts for time interval t1-t2 post merge with master patterns" 860) as "Count=5: Unable to connect to host ( . . . )," "Count=3: Login failed for user ( . . . ) host ( . . . )," and "Count=1: registry service reconnected by ( . . . )."

Method 800 may additionally include reconciling patterns (e.g., of the newly formed log message groups 844, 846 and 848) with a master pattern list 850 and capturing message counts (830). This may involve forming an actual master log message pattern for each log message group (e.g., groups 844, 846 and 848) formed at 820. The actual master log message pattern may be formed by first finding an asymmetric difference between any two log messages of the group, for example, by finding all words which are present in the first log message string but not present in second log message string and marking such words (e.g., by a placeholder "***") as being variable content in the log messages of the group.

Figure 9:
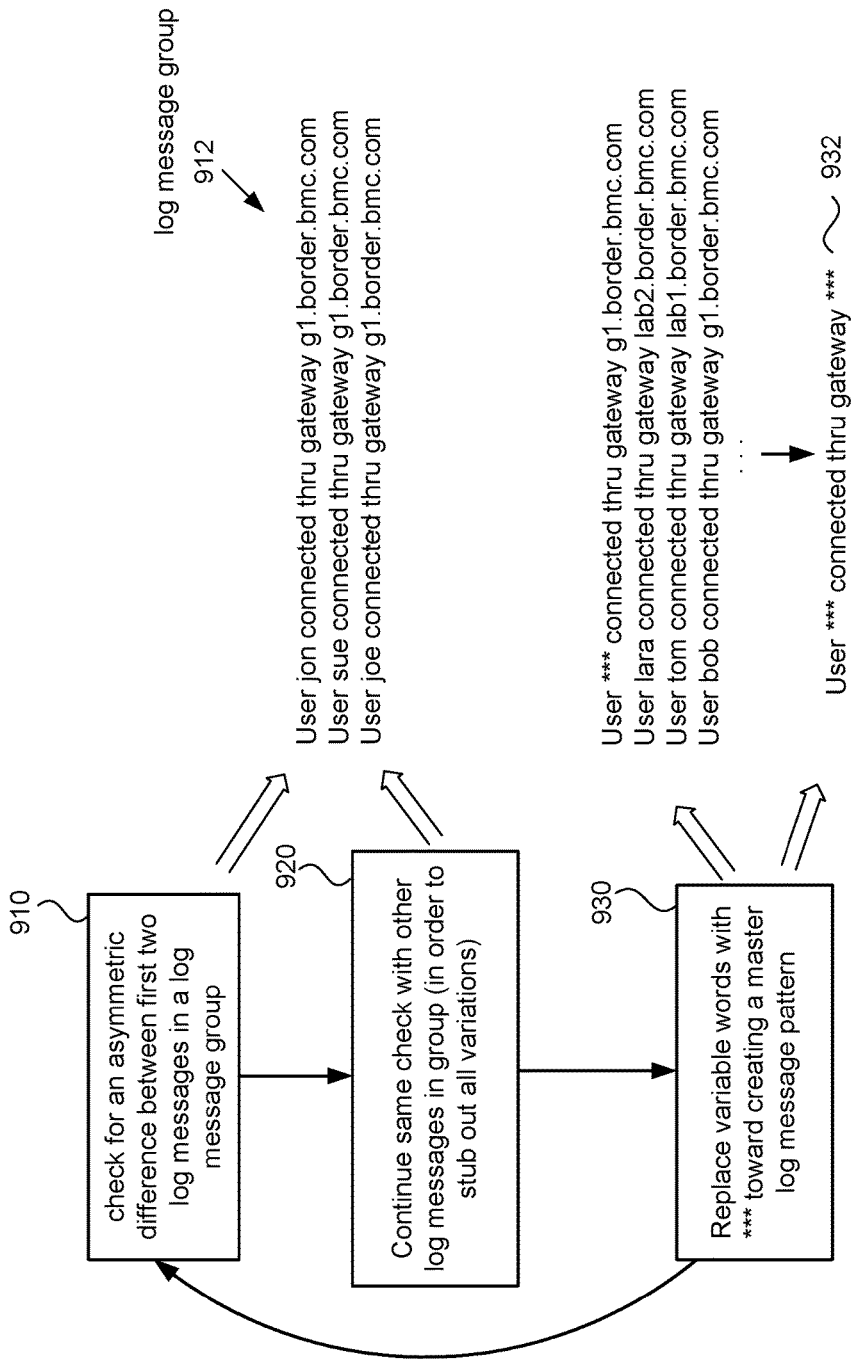
FIG. 9 is a flowchart illustrating an example method for iteratively forming, over time, an actual master log message pattern for each log message group, in accordance with the principles of the present disclosure.

FIG. 9 shows an example method 900 for iteratively forming, over time, an actual master log message pattern for each log message group (e.g., groups 844, 846 and 848) formed at 820. Method 900 may, be implemented, for example, by processes in anomaly calculator 143 and or signature generator 144 of computing system 140.

Method 900 includes checking for an asymmetric difference between first two log messages in a log message group (e.g., log message group 912) (910); continuing the same checking with other log messages in the log message group (920); and replacing the asymmetric difference (i.e., variable word content) in the log messages with a placeholder (e.g., "*") to form a master log message pattern (930). Steps 910-930 may be iteratively repeated for all log messages in the log message group (e.g., log message group 912) to form a final master log message pattern (e.g., final master log message pattern 932). In the final master log message pattern, a majority of variable word content locations are marked with placeholders (e.g., "*"). Final master log message pattern 932 may, for example, have a specific signature (i.e., "user * connected thru gateway *").

Method 900 at 910-930 may include keeping track of a count of the log messages in the group (e.g., log message group 912) that match the final master log message pattern. An output of method 900 may contain the final master log message pattern itself (e.g., final master log message pattern 932), and contain a count of the matching log messages in the group. (As previously discussed, an example of a count of the matching log messages is shown, for example, in FIG. 8 under the heading "reduced aggregated patterns from time interval t1-t2 " 860). The count may provide a measure of the frequency of occurrence of the matching log messages within a time interval (e.g., t1 -t2). This frequency may be used by computer system 140 later on for detecting anomalous log messages in machine-generated messages 120.

The output of method 900 (e.g., final master log message pattern 932 and the count of the matching log messages in the group) may be stored in a repository (e.g., message patterns 134 in database 130). The stored output may be available to computer system 140 for tracking all application and log message pattern strings and for tracking specific message pattern counts in specific time intervals.

In an example implementation, computer system 140 may run method 900 for IT infrastructure installation 110 periodically (e.g., every five minutes), each time processing a new group of log messages generated in the time period. Each period (e.g., every five minutes), method 900 may provide new set of signatures of the final master log message patterns and counts of the matching log messages in the log message groups. The new signatures may be compared with the signatures of the master log message patterns stored in the repository (e.g., message patterns 134 in database 130). In most instances, the new set of signatures may not match the previous set of signatures stored in the repository. In such instances, computer system 140 may run at least portions of method 800 again using, for example, the string distance algorithm at 820 to aggregate or merge the new set of signatures and the previous set of signatures. This manner of merging the new set of signatures and the previous set of signatures may ensure that there are no duplicate signatures stored in the repository. For all merge instances, computer system 140 may add the counts of the matching log messages for two merged signatures together and update the count for the most verbose signature of the two merged signatures in the repository. Running method 900 for IT infrastructure installation 110 periodically (e.g., every five minutes) may establish a history of counts for the log message patterns stored in the repository.

Evaluating Message Pattern Counts in the Specified Time Interval for Anomalies 720

With renewed reference to FIG. 7, after a history of message pattern counts is established for the log message patterns stored in the repository (e.g., by methods 800 and 900 as described above), a next stage of method 700 involves automated identification of which new or recent messages in a recent time interval are anomalous messages (e.g., based on consideration of message pattern counts), and automated "anomaly" scoring of the anomalous messages. It may be expected that only a few of the new or recent messages received in the time interval are anomalous.

A message pattern may be automatically identified as being anomalous by computer system 140 based on consideration of how rare is the occurrence of the message pattern, or on consideration of a substantial change in the frequency (counts) of occurrence of the message pattern over time.

The automated anomaly scoring of the anomalous messages may allow computer system 140 to remove "message" noise (i.e., excess messages) displayed to the administrator by filtering out message patterns with low anomaly scores and to present only message patterns with high anomaly scores for the administrator to view, browse or peruse (e.g., on display 18 of administrator station 150). In an example implementation, computer system 140 (e.g., anomaly calculator 143) may use an anomaly scoring method that assigns anomaly scores to message patterns that are statistical outliers (i.e., message patterns that have rare occurrences) based on the Median Absolute Deviation or Median Absolute Divergence (MAD) method. The same MAD method may also be used by computer system 140 for assigning anomaly scores to message patterns that are not statistical outliers or rare occurrences. The MAD method, unlike other statistical anomaly detection methods, does not assume that the data (i.e., the counts or occurrences of the message patterns per time interval) has a normal distribution.

A MAD parameter for a given data set $X=\{x\_i\}$ is the median of the absolute divergence from the median. The MAD parameter may be given by:

$$MAD(X)=\text{medial}=(\|x\_i-x\_\text{bar}\|),$$

where $x\_bar$ is the median of all $x\_i$ in the data set $\{x\_i\}$.

A MAD score for a data item $x\_i$ may be defined as:

$$\|0.6745*(x\_i-x\_\text{bar})/MAD(X)\|.$$

A data item $x\_i$ may be considered to be an outlier (i.e., a rare occurrence) if its MAD score is greater than 3.5.

Figure 10:
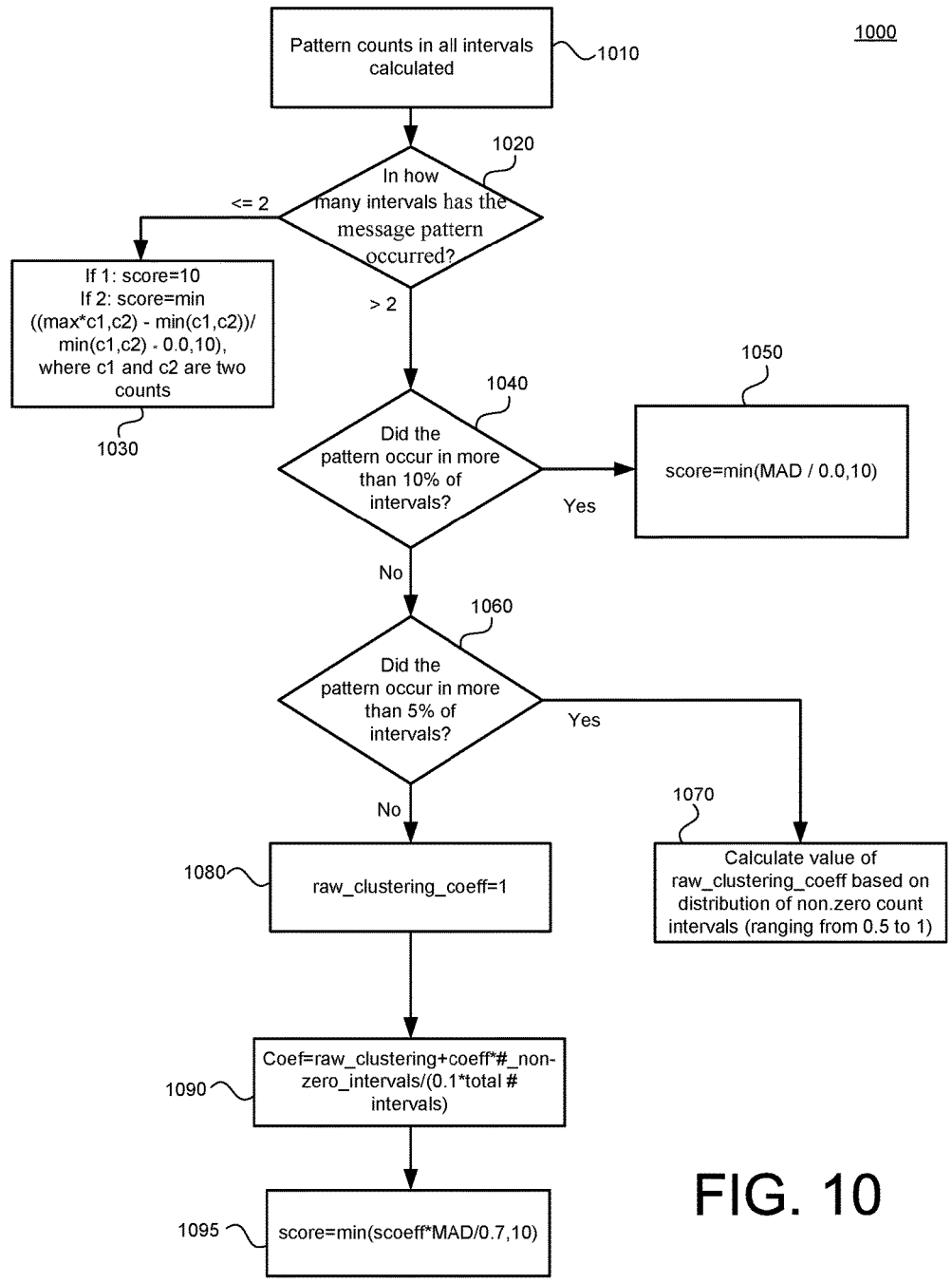
FIG. 10 is a flowchart illustrating an example method for an example anomaly scoring method 1000, which may be implemented by a computer system including an anomaly calculator for assigning an anomaly score to a message pattern, in accordance with the principles of the present disclosure.

FIG. 10 is a flowchart illustrating an example anomaly scoring method 1000 based on MAD statistics, which may be implemented by computer system 140 (e.g., via anomaly calculator 143) for assigning an anomaly score to a message pattern.

Anomaly scoring method 1000 may assign at most a maximum anomaly score (e.g., 10) to any message pattern. Anomaly scoring method 1000 may begin at 1010, ensuring that counts for occurrence of the message pattern (to which the anomaly score is to be assigned) in all time intervals have been calculated and are available in the repository (e.g., in message patterns 134). Method 1000 may include determining in how many time intervals the message pattern has occurred (1020).

If the message pattern rarely occurs (e.g., occurs in 2 or less time intervals), method 1010 may include, at 1030, assigning an anomaly score to the message pattern. If the message pattern occurs in only one time interval, method 1010 may, at 1030, assign the maximum anomaly score of 10 to the message pattern. If the message pattern occurs in only two time intervals with counts c1 and c2, respectively, method 1010 may, at 1030, assign an anomaly score that is linearly interpolated, for example, between 0.0 and 10, to the message pattern. The linearly interpolated anomaly score may, for example, be given by:

$$\min((\max(c1,c2)-\min(c1,c2))/\min(c1,c2)*0.0,10),$$

where c1 and c2 are the respective counts of the message pattern in the two time intervals.

If it is determined at 1020 that the message pattern occurs in more than two time intervals, method 1000 may include, at 1040, determining if the message pattern occurred in more than 10% of the time intervals. If yes, then method 1000 may, at 1050, calculate a MAD anomaly score for the non-zero values of counts of the message pattern, and assign a linearly interpolated anomaly score (e.g., score=min (MAD/0.0, 10) to the message pattern.

If it is determined, at 1040, that the message pattern did not occur in more than 10% of the time intervals, method 1000 may include, at 1060, determining if the message pattern occurred in more than 5% of the time intervals.

If the message pattern occurred in more than 5% of all the time intervals, the message pattern could be a recurring pattern (and not an anomaly). Method 1000 may use a spread ratio to check whether the message pattern occurrences or counts are evenly spread across the time intervals (i.e., whether the message pattern is a recurring pattern). If the message pattern is a recurring pattern, method 1000 may discount the MAD anomaly score for the message pattern. In contrast, if the non-zero counts of the message pattern occur in clusters, it is likely that the message pattern is more abnormal (i.e., anomalous) than an evenly spread or recurring pattern. Method 1000 may accordingly not discount the MAD anomaly score of the message pattern if its non-zero counts occur in clusters.

In an example implementation, for the instance where it is determined at 1060 that the message pattern has occurred in more than 5% of all the time intervals, method 1000 may, at 1070, calculate a spread ratio (e.g., calculate_spread_ratio=number of time intervals with non-zero counts/number of total counts) and map the spread ratio to a "raw_clustering_coeff" parameter. This raw_clustering_coeff parameter may, for example, have a value in the range of 1 to 0.5, with 1 corresponding to an extremely clustered scenario, and 0.5 corresponding to an evenly distributed scenario (for which the calculate_spread_ratio is close to 1).

For the instance where it is determined at 1060 that the message pattern has not occurred in more than 5% of all the time intervals, method 1000 may, at 1080, set the raw_clustering_coeff parameter equal to 1 (i.e., the value corresponding to the extremely clustered scenario).

Method 1000 may further, at 1090, calculate a spread ratio factor (i.e., a "coefficient") to be used in adjusting a raw MAD anomaly score for the message pattern based on how clustered or evenly spread the occurrences of the message pattern are in the time intervals. The spread ratio factor or coefficient for the message pattern may, for example, be defined as:

Coefficient=raw_clustering_coeff*number of intervals appeared/(0.1*total number of intervals), and a spread-ratio-factor adjusted anomaly score for the message pattern may, for example, be defined as:

raw_score=coefficient*MAD.

Method 1000, at 1095, may further assign a spread-ratio-factor adjusted anomaly score to the message pattern that did not occur in more than 10% of the time intervals (and occurred in either less or greater than 5% of all the time intervals). The spread-ratio-factor adjusted anomaly score may be given as:

score=min(coefficient*MAD/0.0,10).

Method 1000 may be used by computer system 140 to assign an anomaly score to any message pattern and counts combination regardless of whether the message pattern occurs in a most recent time interval, or any other previous time interval in history.

It will be noted that method 1000 calculates the anomaly score for a message pattern using median-based statistics and does not require reference to a "base" or reference time period that is free of "anomalous" counts. Further, method 1000 uses a common anomaly scoring scheme for both rare message patterns (patterns that appear in a very small number of intervals) and non-rare message patterns.

In example implementations, computer system 140 may rank message patterns by their anomaly scores and prioritize display of the message patterns with high anomaly scores to the administrator over display of the message patterns with low anomaly scores (e.g., on display 18 of administrator station 150). In some implementations, the anomaly scores of the message patterns may be included in the display of the message patterns as visual guide to draw the administrator's attention to certain message patterns (see e.g., FIG. 5).

Determining Message Pattern Significance Relative to Application Alarms 730

With renewed reference to FIG. 7, even after new messages received in a time interval have been evaluated and ranked by anomaly score at 720 in method 700, there may be too many message patterns for the administrator to reasonably view and investigate. To further narrow the display of anomalous message patterns to relatively more important or critical messages, the anomaly scores of the message patterns may be adjusted based on how the message patterns' anomalous behavior has (or has not) impacted operation of related applications on the IT infrastructure installation in the past. This may be done by determining which of the anomalous message patterns (and underlying messages) are tightly correlated with application alarms and which are not. Existing anomalous message patterns may be assigned significance based on their degrees of correlation with application alarms over time. Raw messages have varying unstructured content, which makes it difficult to establish statistical correlation over time between raw messages and application alarms. However, mapping raw messages to message patterns (as described in the foregoing) removes the unstructured content variations from the raw messages (i.e. the unstructured content is replaced by placeholders), which makes it easier to establish statistical correlation between the message patterns and application alarms.

In an example implementation to determine and assign significance, computing system 140 (e.g., application mapper 142) may carry out correlation computations to determine the degrees of correlation between occurrences of message patterns (e.g., log or event message patterns, application alarms, etc.). The correlation computations may attempt to determine the degrees of correlation between a set of message patterns (log or event message patterns) and a set of application message patterns (e.g., application alarms).

In an example implementation, an anomalous message pattern (log or event message pattern) that is highly correlated with an application alarm may be further classified as being a "significant" anomalous message pattern (e.g., to draw the administrator attention to it). Messages from an application (e.g., Application X) may be tested for correlation with alarms from the same application (e.g., Application X). In example implementations, the correlation computations may be carried out only for log or event message patterns and application alarms that have the same application tags.

The anomalous message patterns (log or event message patterns) and application alarm patterns may be presented to the user in a same display (e.g., FIG. 5). Both the anomalous message patterns and the application alarm patterns may have anomaly scores assigned using a common scheme (e.g., method 1000) for anomaly scoring of the message patterns.

In example implementations to determine significance, correlations between the log or event message patterns and application alarm patterns (which may be stored in message patterns 134 in database 130) may be computed in several time intervals (e.g., 5 minute time intervals) over a most recent time period (e.g., 24 hours). Further, historical correlations over a longer time period (e.g., 2 weeks) may also be computed for determining significance of the message pattern. The time period over which the correlation is carried out may be referred to herein as the "correlation time period." Example definitions of several time windows that may be used for the correlation computations are as follows:

Time interval: smallest unit of time to aggregate counts for event patterns (e.g., 5 minutes)

Correlation time period: a period (e.g. 24 hours) consisting of a number of time intervals as a basis for doing correlation computations.

Anomaly scoring time period: a period consisting of a number of time intervals as a basis for anomaly scoring. This anomaly scoring time period can be of a different duration than the correlation time period.

History time period: a large number of intervals that represent time prior to a current interval that needs to be considered for correlation purposes.

An anomalous message pattern may be included in the set of message patterns (log or event message patterns) for the correlation computations based on a cut-off in the anomaly scores. For example, an anomalous message pattern may be included in the set of message patterns if its anomaly score is greater than 5/10, but excluded if its anomaly score is less than, or equal to, 5/10.

If an anomalous message pattern is included in the set of message patterns (log or event message patterns) for the correlation computations based on an anomaly score cut-off, then its anomaly score may be continually recalculated in the background (e.g., by method 1000) and updated or saved in history so that correlations can be computed efficiently.

For the correlation computations, the message patterns (log or event message patterns and application message patterns) may be represented as a time series of counts across consecutive time intervals in the correlation time period.

For example, an Application Alarm event (e.g., shutdown) time series may be represented in the correlation time period by an event pattern count time series: Application Alarm—(0,0,1,1,0,0,0,1,0,0, . . . ), where 1 or 0 indicate an occurrence or non-occurrence, respectively, of the Application Alarm event (e.g., shutdown) in a respective time interval in the correlation time period. Similarly, an log event or message pattern may be represented in the correlation time period, for example, by an event pattern count time series: EventPattern1—(0,0,1,0,1,0,0,1,1,1, . . . ), where 1 or 0 indicate an occurrence or non-occurrence, respectively, of the log event or message pattern in a respective time interval in the correlation time period. When a message pattern does not occur in a time interval, the count for the message pattern in the time interval is zero. Accordingly, when the message pattern has an event pattern count time series that consists of all zeros for all time intervals in the correlation time period, the message pattern may be ignored and not included in correlation computations.

An example algorithm (which may be implemented, for example, in application mapper 142) to determine if the Application Alarm (event pattern count time series) and a potentially correlated log or event message pattern (event pattern count time series) are correlated may be as follows:

1. Define a correlation time period window width (e.g., 10 hours) over which the correlation is sought
2. If either event pattern count time series count is all 0s, then correlation is automatically set to 0.
3. Otherwise, calculate a Pearson product-moment correlation coefficient "r" for two time series of the same length, (e.g., x=EventPattern1: (0,0,1,0,1,0,0,1,1,1), and y=Application Alarm: (0,0,1,1,0,0,0,1,0,0)) as follows:

$$r = r_{xy} = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}},$$

where x_bar is the average value of x, and y_bar is the average value of y.

The foregoing Pearson product-moment correlation coefficient r has a value between −1 and 1 (inclusive), which quantifies the correlation between the two time series, the highest degree of correlation being r=1. For the example two time series x=EventPattern1: (0,0,1,0,1,0,0,1,1,1), and y=Application Alarm: (0,0,1,1,0,0,0,1,0,0)), r=0.2182).

In example implementations, computer system 140 (e.g., application mapper 142) may use the foregoing algorithm to determine correlations between the Application Alarm and any potentially correlated log or event message patterns. Further, computer system 140 may display the log or event message patterns that have the highest N correlation coefficient r values to the user as being "significant" log or event message patterns (see e.g., FIG. 5).

In example implementation to determine significance, computer system 140 may consider and consolidate historical correlation values between the Application Alarm and all potentially correlated log or event message patterns. Computer system 140 may, for example, calculate the average of all correlations between the two patterns over a "historical time period" (e.g., 2 weeks).

An example algorithm to consider and consolidate historical correlation values between the Application Alarm and all potentially correlated log or event message patterns may be as follows:

1. Calculate aggregate counts for both log or event message patterns and Application Alarms for each time interval (e.g., 1 hour by default) going back to into the historical time period (e.g., 2 weeks).
2. Starting from the current hour, go back one correlation period at a time, and calculate the correlation between the log or event message pattern and Application Alarm. Save the correlation if it is non-zero.
3. Take an average of the (non-zero) correlations in the history period to be an overall correlation between the log or event message pattern and Application Alarm.

Figure 11:
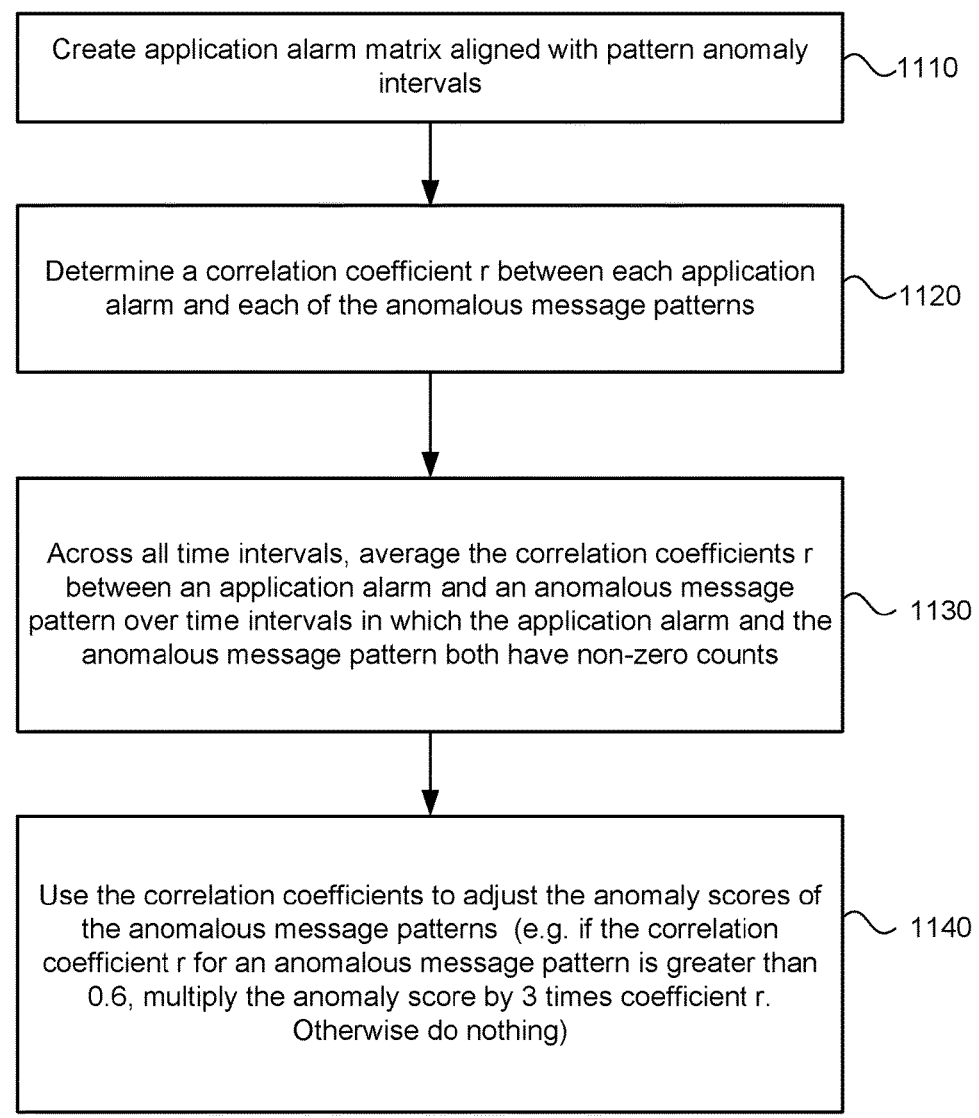
FIG. 11 is a flowchart illustrating an example method, which may be implemented by computer system to determine the significance of anomalous message patterns, in accordance with the principles of the present invention.

FIG. 11 shows an example method 1100, which may be implemented by computer system 140 (e.g., application mapper 142) to determine the significance of anomalous message patterns, in accordance with the principles of the present invention.

Method 1100 may include: creating an application alarm occurrence matrix aligned with anomalous message pattern occurrences over one or more time intervals (1110); determining a correlation coefficient r between each application alarm and each of the anomalous message patterns (1120); across all time intervals, averaging the correlation coefficients r between an application alarm and an anomalous message pattern over time intervals in which the application alarm and the anomalous message pattern both have non-zero counts (1130). Method 1100 may further include using the correlation coefficients to adjust the anomaly scores of the anomalous message patterns (1140). For example, if the correlation coefficient r for an anomalous message pattern is greater than 0.6, the anomaly score for the anomalous message pattern may be multiplied by 3*r. Conversely, if the correlation coefficient r for an anomalous message pattern is less than 0.6, the anomaly score for the anomalous message pattern may be left as is.

Anomalous message patterns with the "N" highest anomaly scores (or highest adjusted anomaly scores) in a time interval may be classified or shown as being significant message patterns, for example, to draw the administrator, attention (e.g., FIG. 6).

Implementations of the various techniques described herein may be implemented in digital electronic circuitry, or in computer hardware, firmware, software, or in combinations of them. Implementations may be implemented as a computer program product, i.e., a computer program tangibly embodied in a non-transitory information carrier, e.g., in a machine-readable storage device (computer-readable medium) for processing by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments. It should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. A computer system for detecting anomalous events in the operation of information technology (IT) components of an IT infrastructure and prioritizing the anomalous events for remediation in the IT infrastructure, the computer system comprising:
   a processor coupled to a memory;
   a database receiving messages that in real time describe events in the operation of the IT components, and storing the received messages as raw messages;
   a signature generator categorizing the raw messages received in a first-time interval by message pattern type and condensing the categorized raw messages into message patterns;
   an anomaly scorer classifying a message pattern as being an anomalous message pattern that corresponds to an anomalous event in the operation of the IT components; and
   an application mapper that:
      assigns a significance value to the anomalous message pattern based on an assessment of an impact of the anomalous event on an availability or a performance of an application in the IT infrastructure; and
      displays the anomalous message pattern based on the significance value assigned to the anomalous message pattern.

2. The computer system of claim 1, wherein the signature generator is configured to replace varying content in the categorized raw messages with placeholders to form the message patterns.

3. The computer system of claim 1, wherein the signature generator, when condensing the categorized raw messages into the message patterns, is configured to:
   determine which of the categorized raw messages are similar to which other raw messages received in the first-time interval based on a string distance threshold between contents of the raw messages;
   aggregate the categorized raw messages into one or more message groups of the similar raw messages received in the first-time interval; and
   replace varying content in the similar raw messages in each of the one or more message groups by a respective placeholder to form a respective message pattern for each of the one or more message groups of the similar raw messages received in the first-time interval.

4. The computer system of claim 3, wherein the signature generator is configured to:
   compare the respective message pattern for each of the one or more message groups of the similar raw messages received in the first-time interval with a master message pattern previously stored in the database; and,
   when the respective message pattern and the previously stored master message pattern are similar based on a string distance threshold, merge the respective message pattern and the previously stored master message pattern.

5. The computer system of claim 1, wherein an anomaly scoring component is configured to assign a respective anomaly score to the message pattern based on a Median Absolute Divergence (MAD) parameter of a distribution of occurrences of the message patterns in an anomaly scoring time period.

6. The computer system of claim 5, wherein the anomaly scoring component is configured to assign a maximum or a near maximum anomaly score to the message pattern that is an outlier relative to a median of an absolute divergence from the median of a distribution of occurrences of the message patterns in the anomaly scoring time period.

7. The computer system of claim 1, wherein the signature generator is configured to:
   keep count of occurrences of the anomalous message pattern in the first-time interval; and,
   store the count along with counts of previous occurrences of the anomalous message pattern in the one or more preceding time intervals.

8. The computer system of claim 1, wherein the application mapper is configured to:
   determine a degree of correlation between occurrences of the anomalous message pattern and occurrences of an application alarm of the application over a correlation time period including the first-time interval; and
   assign the significance value to the anomalous message pattern based on the determined degree of correlation.

9. A method for detecting anomalous events in the operation of information technology (IT) components of an IT infrastructure and prioritizing the anomalous events for remediation in the IT infrastructure, the method comprising:
   receiving messages that describe events in the operation of the IT components in real time and storing the received messages as raw messages in a database;
   categorizing the raw messages received in a first-time interval by message pattern type and condensing the categorized raw messages into message patterns;
   classifying a message pattern in the first-time interval as being an anomalous message pattern that corresponds to an anomalous event in the operation of the IT components;
   assigning a significance value to the anomalous message pattern based on an assessment of an impact of the anomalous event on an availability or a performance of an application in the IT infrastructure; and
   displaying the anomalous message pattern based on the significance value assigned to the anomalous message pattern.

10. The method of claim 9, wherein condensing the categorized raw messages in to message patterns includes replacing varying content in the categorized raw messages by placeholders to form the message patterns.

11. The method of claim 9, wherein condensing the categorized raw messages in to message patterns includes:
   determining which of the categorized raw messages are similar to which other raw messages received in the first-time interval based on a string distance threshold between contents of the raw messages;
   aggregating the categorized raw messages into one or more message groups of the similar raw messages received in the first time interval; and
   replacing varying content in the similar raw messages in each of the one or more message groups by a respective placeholder to form a respective message pattern for each of the one or more message groups of the similar raw messages received in the first-time interval.

12. The method of claim 11, wherein condensing the categorized raw messages into message patterns includes:
   comparing the respective message pattern for each of the one or more message groups of the similar raw messages received in the first-time interval with a master message pattern previously stored in the database; and
   when the respective message pattern and the previously stored master message pattern are similar based on a string distance threshold, merging the respective message pattern and the previously stored master message pattern.

13. The method of claim 9, wherein classifying the message pattern in the first-time interval as being an anomalous message pattern includes assigning a respective anomaly score to the message pattern based on a Median Absolute Divergence (MAD) parameter of a distribution of occurrences of the message patterns in an anomaly scoring time period.

14. The method of claim 13, wherein assigning a respective anomaly score to each of the message patterns includes assigning a maximum or a near maximum anomaly score to a message pattern that is an outlier relative to a median of an absolute divergence from the median of a distribution of occurrences of the message patterns in the anomaly scoring time period.

15. The method of claim 9 further comprising:
   keeping count of occurrences of the anomalous message pattern in the first-time interval; and,
   storing the count along with counts of previous occurrences of the anomalous message pattern in the one or more preceding time intervals.

16. The method of claim 9, wherein assigning a significance value to the anomalous message pattern includes:
   determining a degree of correlation between occurrences of the anomalous message pattern and occurrences of an application alarm of the application over a correlation time period including the first-time interval; and,
   assigning the significance value to the anomalous message pattern based on the determined degree of correlation.

17. A computer program product for detecting anomalous events in the operation of information technology (IT) components of an IT infrastructure and prioritizing the anomalous events for remediation in the IT infrastructure, the computer program product including instructions recorded on a non-transitory computer-readable storage medium and configured to cause at least one processor to:
   receive messages that in real time describe events in the operation of IT components and store the received messages as raw messages in a database;
   categorize the raw messages received in a first-time interval by message pattern type and condense the categorized raw messages into message patterns;
   classify a message pattern in the first-time interval as being an anomalous message pattern that corresponds to an anomalous event in the operation of the IT components;
   assign a significance value to the anomalous message pattern based on an assessment of an impact of the anomalous event on an availability or a performance of an application in the IT infrastructure; and
   display the anomalous message pattern based on the significance value assigned to the anomalous message pattern.

18. The computer program product of claim 17, wherein the instructions, when executed, are further configured to cause the at least one processor to:
   replace varying content in the categorized raw messages with placeholders to form the message patterns.

19. The computer program product of claim 17, wherein the instructions, when executed, are further configured to cause the at least one processor, when condensing the categorized raw messages into message patterns, to:
   determine which of the categorized raw messages are similar to which other raw messages received in the first-time interval based on a string distance threshold between the contents of the raw messages;
   aggregate the categorized raw messages into one or more message groups of the similar raw messages received in the first-time interval; and
   replace the varying content in the similar raw messages in each of the one or more message groups by a respective placeholder to form a respective message pattern for each of the one or more message groups of the similar raw messages received in the first-time interval.

20. The computer program product of claim 19, wherein the instructions, when executed, are further configured to cause the at least one processor, when condensing the categorized raw messages into message patterns, to:
   compare the respective message pattern for each of the one or more message groups of the similar raw messages received in the first-time interval with a master message pattern previously stored in the database; and
   when the respective message pattern and the previously stored master message pattern are similar based on a string distance threshold, merge the respective message pattern and the previously stored master message pattern.

21. The computer program product of claim 17, wherein the instructions, when executed, are further configured to cause the at least one processor, when classifying the message pattern in the first-time interval as being an anomalous message pattern, to:
   assign a respective anomaly score to the message pattern based on a Median Absolute Divergence (MAD) parameter of the distribution of occurrences of the message patterns in an anomaly scoring time period.

22. The computer program product of claim 21, wherein the instructions, when executed, are further configured to cause the at least one processor to assign a maximum or a near maximum anomaly score to a message pattern that is an outlier relative to a median of an absolute divergence from the median of a distribution of occurrences of the message patterns in the anomaly scoring time period.

23. The computer program product of claim 17, wherein the instructions, when executed, are further configured to cause the at least one processor to:

keep count of occurrences of the anomalous message pattern in the first-time interval; and,
store the count along with counts of previous occurrences of the anomalous message pattern in the one or more preceding time intervals.

24. The computer program product of claim 17, wherein the instructions, when executed, are further configured to cause the at least one processor to:
determine a degree of correlation between occurrences of the anomalous message pattern and occurrences of an application alarm of the application over a correlation time period including the first-time interval; and
assign the significance value to the anomalous message pattern based on the determined degree of correlation.

* * * * *